United States Patent [19]
Duecoffre et al.

[11] Patent Number: 6,063,448
[45] Date of Patent: May 16, 2000

[54] COATING MEDIA, THE USE THEREOF, AND A METHOD OF PRODUCING MULTILAYER COATINGS

[75] Inventors: Volker Duecoffre; Carmen Flosbach; Hermann Kerber; Walter Schubert; Friedrich Herrmann, all of Wuppertal; Heinz-Walter Reifferscheid, Bochum; Dirk Schild, Wuppertal, all of Germany

[73] Assignee: Herberts GmbH, Wuppertal, Germany

[21] Appl. No.: 08/981,644

[22] PCT Filed: Jul. 4, 1996

[86] PCT No.: PCT/EP96/02944

§ 371 Date: Mar. 9, 1998

§ 102(e) Date: Mar. 9, 1998

[87] PCT Pub. No.: WO97/03102

PCT Pub. Date: Jan. 30, 1997

[30] Foreign Application Priority Data

Jul. 12, 1995 [DE] Germany ............ 195 25 375

[51] Int. Cl.$^7$ .............. B05D 7/14; B05D 3/02; B05D 1/36
[52] U.S. Cl. .............. 427/407.1; 427/409
[58] Field of Search ............ 427/409, 407.1

[56] References Cited

U.S. PATENT DOCUMENTS

| | | |
|---|---|---|
| 3,637,546 | 1/1972 | Parker . |
| 4,076,766 | 2/1978 | Simms .......... 428/425 |
| 4,382,114 | 5/1983 | Hohlein ............ 428/423.1 |
| 4,565,730 | 1/1986 | Poth et al. ........... 428/204 |
| 4,960,828 | 10/1990 | Higuchi et al. ........... 525/162 |
| 5,098,956 | 3/1992 | Balsko et al. ........... 525/123 |
| 5,290,633 | 3/1994 | Devlin et al. ........... 427/385.5 |
| 5,326,820 | 7/1994 | Hoffmann ............ 525/123 |
| 5,336,711 | 8/1994 | Schneider .......... 524/507 |
| 5,460,892 | 10/1995 | Bederke ............ 428/482 |
| 5,466,860 | 11/1995 | Flosbach ............ 560/43 |
| 5,698,330 | 12/1997 | Bederke et al. ........... 427/409 |
| 5,731,382 | 3/1998 | Bederke et al. ........... 427/409 |
| 5,739,216 | 4/1998 | Duecoffre et al. ........... 528/438 |
| 5,753,756 | 5/1998 | Aerts et al. ........... 525/111.5 |
| 5,759,631 | 6/1998 | Rink et al. ........... 427/409 |
| 5,882,734 | 3/1999 | Blum et al. ........... 427/407.1 |

FOREIGN PATENT DOCUMENTS

| | | |
|---|---|---|
| 2 100 493 | 1/1994 | Canada . |
| 0 036 975 | 10/1981 | European Pat. Off. . |
| 0 543 228 | 5/1993 | European Pat. Off. . |
| 0 604 922 | 7/1994 | European Pat. Off. . |
| 0653 468 A2 | 11/1994 | European Pat. Off. . |
| 42 23 182 | 7/1993 | Germany . |
| 0 607 792 | 7/1994 | Germany . |
| WO 92/02590 | 2/1992 | WIPO . |

*Primary Examiner*—Diana Dudash
*Attorney, Agent, or Firm*—Pillsbury Madison & Sutro LLP

[57] ABSTRACT

A coating medium suitable for multilayer coatings, containing, as a binder vehicle:

| | | |
|---|---|---|
| A) | 10 to 90% by weight | of one or more hydroxy-functional (meth)acrylic copolymers, obtained from |
| a1) | 20 to 40% by weight | of hydroxyalkyl esters of (meth)acrylic acid |
| a2) | 10 to 30% by weight | of non-functionalised (meth) acrylates |
| a3) | 0 to 5% by weight | of unsaturated carboyxlic acids |
| a4) | 10 to 60% by weight | of non-functionalised monomers |
| a5) | 0 to 15% by weight | of amino-functional monomers, and |
| a6) | 0 to 5% by weight | of multiply-unsaturated monomers |
| B) | 90 to 10% by weight | of hydroxy-functional polyesters, |
| C) | 0 to 40% by weight | of hydroxy-functional binder vehicles |
| D) | 5 to 50% by weight | of blocked polyisocyanates, |
| E) | 5 to 40% by weight | of components based on triazine which crosslink with the hydroxyl groups of components A), B) and C) with the formation of ether and/or ester groups, | wherein at least 50% by weight of the (meth)acrylic copolymers, with respect to the total amount of component A), has been produced in the presence of the hydroxy-functional polyesters corresponding to at least 20% by weight of the total amount of component B).

8 Claims, No Drawings

COATING MEDIA, THE USE THEREOF, AND A METHOD OF PRODUCING MULTILAYER COATINGS

This application is the national phase of international application PCT/EP96/02944 filed Jan. 30, 1997 which designated the U.S.

This invention relates to coating media which are particularly suitable for multilayer stoving coatings for the series coating of automobiles, and which are distinguished in particular by their high resistance to chemicals, their high resistance to water of condensation and their excellent condition for covering lacquer.

DE-A-43 38 703 describes a coating medium which contains a combination of two different hydroxy-functional (meth)acrylic copolymers and which contains a crosslinking agent combination comprising blocked polyisocyanate and aminoplast resin. Polyester resin may optionally be admixed with the (meth)acrylic copolymers as a further binder vehicle.

EP-A-0 541 604 and EP-A-0 206 072 describe acrylic polymers and the production thereof. These acrylic polymers can be produced in the presence of thinners, which may comprise polyester polyols. EP-A-0 036 975 describes clear lacquers for multilayer coatings, which consist of a two-component system (2-C system) comprising a polyol component and a polyisocyanate component which contains biuret and/or isocyanurate groups. The polyol component is a polyester polyol which may be present in the mixture with a polyacrylic resin. The polyacrylic resin can be produced in the presence of the polyester polyol.

The object of the present invention was to provide coating media for multilayer stoving coatings which are suitable for the series coating of automobiles and which are distinguished by their high resistance to chemicals, in particular acid resistance, their high resistance to water of condensation and their excellent condition for covering lacquer.

It has been shown that this object can be achieved by a coating medium which forms a subject of the present invention and which contains, as a binder vehicle:

| | | |
|---|---|---|
| A) | 10 to 90% by weight | of one or more hydroxy-functional (meth)acrylic copolymers, obtained from |
| a1) | 20 to 40% by weight | of one or more hydroxyalkyl esters of (meth)acrylic acid |
| a2) | 10 to 30% by weight | of one or more non-functionalised (meth) acrylates |
| a3) | 0 to 5% by weight | of one or more unsaturated carboyxlic acids |
| a4) | 10 to 60% by weight | of one or more non-functionalised monomers different from a2) |
| a5) | 0 to 15% by weight | of one or more amino-functional monomers |
| a6) | 0 to 5% by weight | of one or more multiply-unsaturated monomers |
| B) | 90 to 10% by weight | of one or more hydroxy-functional polyesters, |
| C) | 0 to 40% by weight | of one or more hydroxy-functional binder vehicles different from A) and B), |
| D) | 5 to 50% by weight | of one or more blocked polyisocyanates, |
| E) | 5 to 40% by weight | of one or more components based on triazine which crosslink with the hydroxyl groups of components A), B) and optionally C) with the formation of ether and/or ester groups, | wherein the sum of components A) to E) adds up to 100% in each case, and wherein at least 50% by weight of the (meth)acrylic copolymers, with respect to the total amount of component A), has been produced in the presence of one or more of the hydroxy-functional polyesters corresponding to at least 20% by weight of the total amount of component B).

The coating media according to the invention are formulated in particular as single-component (1-C) systems.

According to a particularly preferred embodiment of the invention, the hydroxy-functional polyesters of component B) of the binder vehicles are obtainable from

| | | |
|---|---|---|
| b1) | 0 to 60% by weight | of monocarboxylic acids of molecular weight range 112 to 600 |
| b2) | 10 to 70% by weight | of polycarboxylic acids of molecular weight range 98 to 600 or anhydrides of polycarboxylic acids of this type |
| b3) | 5 to 40% by weight | of tri- and/or polyhydric alcohols of molecular weight range 100 to 400 |
| b4) | 0 to 40% by weight | of dihydric alcohols of molecular weight range 62 to 2000 |
| b5) | 0 to 30% by weight | of monohydric alcohols of molecular weight range 100 to 400 |
| b6) | 0 to 15% by weight | of hydroxycarboxylic acids of molecular weight range 90 to 280 or of lactones of hydroxycarboxylic acids of this type, and |
| b7) | 0 to 15% by weight | of amino alcohols of molecular weight range 61 to 300 and/or of aminocarboxylic acids of molecular weight range 75 to 260. |

During the preparation of the binder vehicles contained in the coating media according to the invention, at least 50% by weight, preferably more than 70% by weight, of the total amount of (meth)acrylic copolymer A), and most preferably the total amount thereof, is produced in the presence of at least 20% by weight, preferably more than 30% by weight, most preferably more than 40% by weight, of polyester resin B), wherein the last-mentioned percentages by weight are quoted with respect to the total amount of component B). If a plurality of polyesters is used as component B), these may be present as a mixture during the production of (meth) acrylic copolymer A), or individual polyesters or part of the polyesters may be used and the remainder added at a later point in time. Production of the (meth)acrylic copolymer A) may be effected by radical-initiated polymerisation by the usual methods. In the course of this procedure, at least 20% by weight, preferably more than 30% by weight, most preferably more than 40% by weight, of polyester resin B) is placed in the reaction vessel, preferably in admixture with suitable organic solvents, and is heated to the reaction temperature, and at least 50% by weight, preferably more than 70% by weight, most preferably the total amount of the monomer mixture, which optionally contains radical initiators, for the synthesis of (meth)acylic copolymer A) is added. The residual amount which may optionally remain of the monomer mixture, which optionally contains radical initiators, for the synthesis of (meth)acrylic copolymer A) may be polymerisaed by radical initiation in the same manner, wherein organic solvent only, without proportions of polyester B), is placed in the reaction vessel and is heated to the reaction temperature, and the procedure thereafter is as described above. The (meth)acrylic copolymer A) which is obtained by polymerisation of the residual amount of monomer mixture which optionally remains can be admixed, during the formulation of the coating medium according to the invention, with the (meth)acrylic copolymer A) which was synthesised in the presence of polyester resin B).

The expression "(meth)acrylic" which is used in the present description and in the claims is synonymous with "acrylic" and/or "methacrylic".

The polymerisation is conducted, for example, at temperatures between 80° C. and 180° C., preferably at 100° C. to 150° C.

The polymerisation reaction can be started with known radical initiators. Examples of radical initiators include dialkyl peroxides such as di-tert.-butyl peroxide or di-cumyl peroxide; diacyl peroxides such as dibenzoyl peroxide or dilauryl peroxide; hydroperoxides such as cumene hydroperoxide or tert.-butyl hydroperoxide; peresters such as tert.-butyl perbenzoate, tert.-butyl perpivalate, tert.-butyl per-3,5,5-trimethylhexanoate or tert.-butyl per-2-ethylhexanoate; peroxydicarbonates such as di-2-ethylhexyl peroxydicarbonate or dicyclohexyl peroxydicarbonate; perketals such as 1,1-bis-(tert.-butylperoxy)-3,5,5-trimethylcyclohexane or 1,1-bis-(tert.-butylperoxy)-cyclohexane; ketone peroxides such as cyclohexane peroxide or methyl isobutyl ketone peroxide; and azo compounds such as 2,2'-azo-bis(2,4-dimethylvaleronitrile), 2,2'-azobis(2-methylbutyronitrile), 1,11-azobiscyclohexanecarbonitrile or azobisisobutyronitrile; and C-C cleavage initiators such as such as benzpinacol derivatives, for example.

The polymerisation initiators are. generally added, for example, in an amount of 0.1 to 4% by weight, with respect to the amount of monomer weighed in. The monomers may also be added separately or delayed chronologicaly during the polymerisation. The monomers or the monomer mixture used may contain the radical initiators or the radical initiators may be added to the monomer mixture, optionally with a slight chronological delay or separately.

Production of (meth)acrylic copolymer A) is effected, as described above, in the presence of at least partial amounts of polyester resin B), which is preferably provided dissolved in an organic solvent. Examples of solvents which can be used include those which are also employed for the polyester resin synthesis; the polyester resin may thus be provided as a solution which was obtained during the production thereof. Other suitable solvents may also be used, however. For example, customary lacquer solvents are suitable, such as those which can be used later in the coating media according to the invention, for example: glycol ethers such as butyl glycol, butyl diglycol, dipropylene glycol dimethyl ether, dipropylene glycol monomethyl ether or ethylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; ketones such as methyl ethyl ketone, methyl isobutyl ketone, diisobutyl ketone, cyclohexanone or isophorone; alcohols such as methanol, ethanol, propanol or butanol; aromatic hydrocarbons such as xylene, Solvesso 100 (registered trade mark for a mixture of aromatic hydrocarbons with a boiling range of 155 to 185° C.) and aliphatic hydrocarbons may also be used in a blend with the aforementioned solvents.

Chain transfer agents may be used in conjunction in order to regulate the molecular weight. Examples include customary chain transfer agents, such as mercaptans, thioglycolic acid esters, chlorinated hydrocarbons, cumene and dimeric α-methylstyrene.

The polymerisation conditions (reaction temperature, period of admission of the monomer mixture, solution concentration) are adjusted so that (meth)acrylic copolymers A) for the coating medium produced according to the invention have a number average molecular weight Mn (determined by gel permeation chromatography using polystyrene as the calibration substanice) between 1000 and 10,000.

The (meth)acrylic copolymers A), which contain hydroxyl groups, of the coating medium produced according to the invention preferably have a glass transition temperature range between −10 and +70° C.

The (meth)acrylic copolymer A) preferably has an OH number of 30 to 250 mg KOH/g and an acid number of 0 to 60, particularly 5 to 20 mg KOH/g. Hydroxy-functionalised (meth)acrylates which contain primary and/or secondary OH groups are used as component a1), for example, as monomers for the production of hydroxy-functional (meth) acrylic copolymers A).

Examples of monomers having primary hydroxy functions include hydroxyalkyl esters of α,β-unsaturated carboxylic acids such as acrylic acid and/or methacrylic acid having a primary OH group in the $C_2$–$C_3$ hydroxyalkyl radical, such as hydroxyethyl (meth)acrylate, as well as hydroxyalkyl esters of α,β-unsaturated carboxylic acids, such as acrylic acid and/or methacrylic acid, for example, having a primary OH group in the $C_4$–$C_{18}$ hydroxyalkyl radical, such as butanediol monoacrylate, hydroxyethyl acrylate, hydroxyoctyl acrylate and the corresponding methacrylates, for example, and reaction products of hydroxyethyl (meth)acrylate with caprolactone.

Examples of monomers having secondary OH functions include hydroxypropyl (meth)acrylate, addition products of glycidyl (meth)acrylate and saturated short-chain fatty acids containing $C_2$–$C_3$ alkyl radicals, e.g. acetic acid or propionic acid, as well as addition products of glycidyl esters of strongly branched monocarboxylic acids (the glycidyl ester of versatic acid is obtainable under the trade name Cardura E) with unsaturated COOH-functional compounds, such as acrylic and/or methacrylic acid, maleic acid or crotonic acid for example, addition products of Cardura E with unsaturated anhydrides such as maleic anhydride for example, reaction products of glycidyl (meth)acrylate with saturated, branched or unbranched fatty acids comprising $C_4$–$C_{20}$ alkyl radicals, e.g. butanoic acid, caproic acid, lauric acid, palmitic acid, stearic acid or arachidic acid. The reaction of acrylic acid or methacrylic acid with the glycidyl ester of a carboxylic acid comprising a tertiary α-carbon atom may be effected before, during (in situ) or after the polymerisation reaction, in the sense of a reaction analogous to a polymerisation.

The preferred monomers a1) are 1,4-butanediol mono (meth)acrylate, hydroxyethyl (meth)acrylate and 2-hydroxypropyl (meth)acrylate.

Non-functionalised (meth)acrylates can be used as component a2) as monomers for the production of the hydroxy-functional (meth)acrylic copolymer A), for example, such as branched or unbranched saturated monomers such as alkyl (meth)acrylates having $C_8$–$C_{18}$ chains in the alkyl component, e.g. ethylhexyl (meth)acrylate, octyl (meth) acrylate, 3,5,5-trimethylhexyl (meth)acrylate, decyl (meth) acrylate, dodecyl (meth)acrylate, hexadecyl (meth)acrylate, octadecyl (meth)acrylate, cyclohexyl (meth)acrylate, lauryl acrylate-1214, isobornyl (meth)acrylate or 4-tert.-butylcyclohexyl methacrylate. Further examples include short- or medium chain, branched or unbranched saturated monomers, such as alkyl (meth)acrylates having $C_1$–$C_7$ chains in their alkyl component, e.g. methyl (meth)acrylate, ethyl (meth)acrylate, propyl acrylate, butyl (meth)acrylate, isopropyl (meth)acrylate, isobutyl (meth)acrylate, tert.-butyl (meth)acrylate, pentyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate and octadecenyl (meth)acrylate.

The preferred monomers a2) comprise butyl (meth) acrylate, ethylhexyl (meth)acrylate, cyclohexyl (meth) acrylate and isobutyl (meth)acrylate.

Examples of suitable unsaturated carboxylic acids of component a3) include unsaturated mono- and/or dicarboxylic acids and/or semi-esters of dicarboxylic acids, such as acrylic, methacrylic, itaconic, crotonic, isocrotonic, aconitic, maleic and fumaric acids for example, semi-esters of maleic and fumaric acids, and β-carboxyethyl acrylate and addition compounds of hydroxyalkyl esters of acrylic acid and/or methacrylic acid with carboxylic acid anydrides, such as phthalic acid mono-2-methacryloyloxyethyl ester, and semi-esters of maleic anhydride formed by the addition of saturated aliphatic alcohols, such as ethanol, propanol, butanol and/or isobutanol, for example.

Acrylic acid is the preferred monomer a3).

Component a3) is preferably used in the production of the (meth)acrylic copolymer in a proportion such that an acid number of 5 to 20 mg KOH/g of the (meth)acrylic copolymer A) is obtained.

Monovinyl aromatic compounds are examples of monomers of component a4) which are different from a2). These preferably contain 8 to 10 carbon atoms per molecule. Examples of suitable compounds include styrene, vinyl toluenes, α-mathylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol, vinyl esters of alpha, alpha-dialkyl-substituted branched aliphatic monocarboxylic acids (for example the commercial product VEOVA 10 of Shell AG), as well as alkyl esters of maleic, fumaric, tetrahydrophthalic, crotonic, isocrotonic, vinylacetic and itaconic acid, such as the corresponding methyl, ethyl, propyl, butyl, isopropyl, isobutyl, pentyl, amyl, isoamyl, hexyl, cyclohexyl, 2-ethylhexyl, octyl, 3,5,5-trimethylhexyl, decyl, dodecyl, hexadecyl, octadecyl and octadecenyl esters, and also gamma-methacryloxypropyl trimethoxysilane.

Styrene and derivatives thereof, such as vinyl toluenes, for example, are preferably used as monomers of component a4).

Examples of monomers of component a5) include those comprising terminal tertiary amino groups such as tert.-aminomethyl methacrylate or tert.-aminopropyl methacrylate. When using monomers of this type, it is advisable to avoid the simultaneous use of glycidyl-functionalised monomers, since gelling of the polymer cannot otherwise be ruled out.

In addition, small proportions of monomers of component a6) which contain at least two polymerisable, olefinically unsaturated double bonds may also be used. The proportion of these monomers is preferably less than 5% by weight with respect to the total weight of monomers. Examples of compounds of this type include hexanediol diacrylate, hexanediol methacrylate, ethylene glycol diacrylate, ethylene glycol dimethacrylate, butenediol diacrylate, butanediol dimethacrylate, hexamethylene-bis-methacrylamide, trimethylolpropane triacrylate, trimethylolpropane trimethacrylate and similar compounds.

The polyester resins B) preferably have number average molecular weights of 200 to 5000, most preferably 1000 to 3000, an OH number of 30 to 450 mg KOH/g, most preferably from 120 to 280 mg KOH/g, and an acid number of 0 to 60 mg KOH/g, most preferably from 2 to 35 mg KOH/g, and may be produced, for example, by condensation polymerisation from components b1) to b7). The condensation polymerisation may be effected by the usual methods familiar to one skilled in the art, for example in the presence of customary crosslinking catalysts and at elevated temperatures, e.g. from 180 to 250° C., and in the melt for example. Entrainment agents, such as xylene for example, may also optionally be used.

The percentages by weight of components b1) to b7) which are used in the production of the polyester are selected in particular so that the desired OH numbers are obtained.

Examples of suitable monocarboxylic acids b1) include benzoic acid, tert.-butylbenzoic acid, hexahydrobenzoic acid, saturated fatty acids such as 2-ethylhexanoic acid, isononanoic acid, coconut oil fatty acid, hydrogenated industrial fatty acids or fatty acid mixtures for example, decanoic acid, dodecanoic acid, tetradecanoic acid, stearic acid, palmitic acid, docosanoic acid, unsaturated fatty acids, such as soyabean fatty acid, sorbic acid, groundnut oil fatty acid, conjuene fatty acid, tall oil fatty acid, safflower oil fatty acid and mixtures of these or other monocarboxylic acids, for example. The proportion of monocarboxylic acids is preferably more than 10% by weight and less than 40% by weight.

2-ethylhexanoic acid and isononanoic acids are preferably used as monocarboxylic acid b1).

Component b2) is used in an amount of 10 to 70% by weight, for example from 10 to 40% by weight. Examples of suitable polycarboxylic acids b2) or anhydrides include phthalic acid or anhydride, isophthalic acid, terephthalic acid, tetrahydrophthalic acid or anhydride, hexahydrophthalic acid or anhydride, 1,3- and 1,4-cyclohexanedicarboxylic acid, maleic acid or anhydride, succinic acid or anhydride, fumaric acid, adipic acid, sebacic acid, azelaic acid, dimeric fatty acids, trimeric fatty acids, trimellitic acid or anhydride, pyromellitic acid or anhydride, and mixtures of these or other acids.

The preferred polycarboxylic acids b2) are adipic acid and cycloaliphatic dicarboxylic acids such as hexahydrophthalic acid or anhydride and 1,4-cyclohexanedicarboxylic acid.

Examples of suitable tri- and polyhydric alcohols b3) include glycerol, trimethylolpropane, pentaerythritol, dipentaerythritol and mixtures of these or other polyhydric alcohols.

The preferred tri- and polyhydric alcohols b3) are trimethylolpropane and pentaerythritol.

Examples of suitable dihydric alcohols b4) include ethylene glycol, 1,2- and 1,3-propylene glycol, 1,3-, 1,4- and 2,3-butanediol, 1,5-pentanediol, 1,6-hexanediol, 2,5-hexanediol, trimethylhexanediol, diethylene glycol, triethylene glycol, hydrogenated bisphenols, 1,4-cyclohexanediol, 1,4-cyclohexanedimethanol, neopentyl glycol, tricyclodecanediol and mixtures of these or other diols.

The preferred dihydric alcohols b4) are 1,6-hexanediol and neopentyl glycol.

Examples of suitable monohydric alcohols b5) include n-hexanol, cyclohexanol, decanol, dodecanol, tetradecanol, octanol, octadecanol, natural and synthetic fatty alcohols, such as lauryl alcohol, Ocenol 110/130 (manufactured by Henkel) and mixtures of these and other alcohols, for example.

Examples of suitable starting components b6) include dimethylolpropionic acid, lactic acid, malic acid, tartaric acid, epsilon-hydroxycaproic acid, ricinoleic acid or epsilon-caprolactone.

The preferred components b6) are dimethylolpropionic acid and epsilon-caprolactone.

Examples of suitable starting components b7) include aminoethanol, 2-aminopropanol, diethanolamine, aminoacetic acid or 6-aminohexanoic acid.

Examples of suitable esterification catalysts for the production of the polyester resin B) may comprise: dibutyltin oxide, sulphuric acid or p-toluenesulphonic acid.

After the condensation polymerisation is complete, the solids content of polyester resin B) may optionally be adjusted by dilution with suitable organic solvents. Examples of suitable organic solvents include the solvents mentioned above for the synthesis of the (meth)acrylic copolymer A), or mixtures of these or other solvents.

The (meth)acrylic copolymer A) is produced, as described above, in the presence of the polyester resin B).

The hydroxy- and optionally carboxy-functional (meth) acrylic copolymers A) and polyester resins B) which can be used may be "chain-lengthened" with a lactone. Lactones (cyclic ethers) add to hydroxyl and/or carboxyl groups, whereupon the ring is opened and a new terminal hydroxyl or carboxyl group is formed. Epsilon-caprolactone is an example of a particularly preferred lactone.

Examples of other lactones include lactones such as beta-propiolactone, delta-valerolactone, gamma-butyrolactone, zeta-enantholactone and eta-caprylolactone. Lactones of this type may be substituted: examples thereof include 6-methyl-epsilon-caprolactone, 3-methyl-epsilon-caprolactone, 5-methyl-epsilon-caprolactone, 5-vinyl-epsilon-caprolactone,4-methyl-delta-valerolactone,3,5-dimethyl-epsilon-caprolactoneand mixtures thereof. The reaction with the lactone may be effected immediately following the resin synthesis, for example, namely following the synthesis of the (meth)acrylic polymer A) and/or of the polyester resin B). The reaction is conducted, for example, at elevated temperature, e.g. at temperatures up to 100° C. The reaction may be carried out for up to 10 hours with stirring, for example.

The coating media according to the invention may contain, as component C), one or more hydroxy-functional binder vehicles which are different from A) and B), for example (meth)acrylic copolymer resins which are different from A), or polyester resins or even polyurethane resins which are different from B). The coating media according to the invention preferably contain no further binder vehicles in addition to A) and B).

The coating media according to the invention contain one or more blocked polyisocyanates as component D).

Examples of polyisocyanates which can be used in blocked form as component D) in the coating medium according to the invention include cycloaliphatic, aliphatic or aromatic polyisocyanates such as 1,2-propylene diisocyanate, 2,3-butylene diisocyanate, tetramethylene diisocyanate, 1,6-hexamethylene diisocyanate, 2,2,4-trimethylene diisocyanate, 1,12-dodecane diisocyanate, cyclohexane 1,3- and 1,4-diisocyanate, 1-isocyanato-3,3,5-trimethyl-5-isocyanato-methylcyclohexane (=isophorone diisocyanate: IPDI), perhydro-2,4'- and/or 4,4'-diphenylmethane diisocyanate, 1,3- and 1,4-phenylene diisocyanate, toluene 2,4- and 2,6-diisocyanate, diphenylmethane-2,4'- and/or-4,4'-diisocyanate, 3,2'- and/or 3,4-diisocyanato-4-methyl-diphenylmethane, naphthylene 1,5-diisocyanate, m-xylylene diisocyanate, p-xylylene diisocyanate, triphenylmethane 4,4'-triisocyanate, tetramethylxylylene diisocyanate or mixtures of these compounds.

In addition to these simple isocyanates, those which contain hetero atoms in the radical linking the isocyanate groups are also suitable. Examples of these include polyisocyanates containing carbodiimide groups, allophanate groups, isocyanurate groups, uretdione groups, urethane groups, acylated urea groups and biuret groups.

The known polyisocyanates which are primarily used for the production of lacquers are particularly suitable for the invention, e.g. modification products, which contain biuret, isocyanurate or urethane groups, of the aforementioned simple polyisocyanates, particularly tris-(6-isocyanatohexyl)-biuret, the isocyanurate derived from isophorone diisocyanate or hexane diisocyanate, or polyisocyanates containing low molecular weight urethane groups, such as those which can be obtained by the reaction of isophorone diisocyanate, used in excess, with simple polyhydric alcohols of molecular weight range 62 to 300, particularly with trimethylolpropane. Any mixtures of the said polyisocyanates may also of course be used for the production of the products according to the invention.

Other suitable polyisocyanates include the known prepolymers containing terminal isocyanate groups, which can be obtained in particular by the reaction of the aforementioned simple polyisocyanates, primarily diisocyanates, with less than stoichiometric amounts of organic compounds containing at least two groups capable of reacting with isocyanate groups. Compounds such as these which are preferably used are those which contain a total of at least two amino groups and/or hydroxy groups and which have a number average molecular weight of 300 to 10,000, preferably 400 to 6000. The corresponding polyhydroxyl compounds are preferably used, e.g. the hydroxypolyesters, hydroxypolyethers and/or acrylate resins containing hydroxyl groups which are known in the art in polyurethane chemistry. In these known prepolymers, the ratio of isocyanate groups to hydrogen atoms which are reactive towards isocyanate groups corresponds to 1.05 to 10:1, preferably 1.1 to 3:1, wherein the hydrogen atoms preferably originate from hydroxyl groups. Moreover, the type and quantitative ratios of the starting materials used in the production of the NCO prepolymers are preferably selected so that the NCO prepolymers have an average NCO functionality of 2 to 4, preferably from 2 to 3, and a number average molecular weight of 500 to 10,000, preferably from 800 to 4000.

It is also possible to use copolymers of the vinylically unsaturated monoisocyanate dimethyl-m-isopropenylbenzyl isocyanate as a polyisocyanate, as described, amongst other features, in DE-A-41 37 615.

Customary blocking agents may be used, such as customary CH-acid, NH-, SH- or OH-functional compounds which facilitate crosslinking under hardening conditions. Examples include CH-acid compounds such as acetylacetone or CH-acid esters such as acetoacetic acid alkyl esters or malonic acid dialkyl esters, aliphatic or cycloaliphatic alcohols such as n-butanol, isopropanol, tert.-butanol, furfurol, 2-ethylhexanol, or cyclohexanol; phenols such as cresol or tert.-butylphenol, dialkylaminoalcohols such as dimethylaminoalcohol, oximes such as methyl ethyl ketoxime, acetone oxime, cyclohexanone oxime or acetophenone oxime, lactams such as e-caprolactam or pyrrolidone-2, imides such as phthalimide or N-hydroxy-maleic imide, hydroxyalkyl esters, hydroxamic acids and esters thereof, N-alkylamides such as methylacetamide, imidazoles such as 2-methylimidazole, or pyrazoles such as 2,3-dimethylpyrazole. Mixtures of these blocking agents may also be used, however.

Within the scope of the present invention, CH-acid esters and/or oximes are preferred as blocking agents for the polyisocyanates. CH-acid esters are particularly preferred. The alkyl groups of the esters, which in malonic acid dialkyl esters or acetoacetic acid esters may be the same or different, preferably contain 1 to 5 carbon atoms. Examples of malonic acid dialkyl esters include $C_2$–$C_5$ alkyl esters, such as malonic acid dimethyl, diethyl, diisopropyl, dibutyl, di-tert. -butyl and dipentyl esters. Malonic acid diethyl ester is particularly preferred. Examples of acetoacetic acid alkyl esters include $C_2$–$C_5$ alkyl esters, such as acetoacetic acid methyl, ethyl, isopropyl, butyl, tert.-butyl and pentyl esters. Acetoacetic acid ethyl ester is particularly preferred.

Examples of preferred oximes include acetone oxime and butanone oxime. It is also possible to use mixtures of these blocking agents.

The molar ratio of the blocking agents, which contain active hydrogen, to the NCO groups of the isocyanates, for example the ratio of the malonic acid dialkyl esters and/or acetoacetic acid alkyl esters to NCO groups, can be varied, for example from 0.5:1 to 1.5:1. When there is an excess of NCO, the free NCO groups may optionally be reacted with other reactants.

The blocking reaction with CH-acid compounds may preferably be catalysed. The catalysts used for the blocking of the polyisocyanates are preferably alkali hydroxides, for example alkali metal hydroxides such as lithium, sodium and/or potassium hydroxide. The anhydrous alkali metal hydroxides are preferably used. Lithium hydroxide is most preferably used. The catalysts are used in small amounts, for example in amounts of 0.1 to 2% by weight, preferably 0.3 to 1% by weight, with respect to the weight of isocyanate and CH-acid blocking agent. The catalysts are used in solid form, e.g pulverised, and are removed from the reaction mixture after the completion of the blocking reaction, by filtration for example.

More than one type of protective group, for example those of different reactivities, may also be used for blocking.

It is thus possible, for example, to use a mixture of two or more different blocked polyisocyanates D) or to use a polyisocyanate which is blocked intramolecularly with two or more different protective groups.

In addition, the coating media according to the invention contain one or more components E) based on triazine, which crosslink with the hydroxyl groups of components A), B) and optionally C) with the formation of ether and/or ester groups.

Preferred examples of the components E) based on triazine, which crosslink with the hydroxyl groups of components A), B) and optionally C) with the formation of ether and/or ester groups, include melamine resins which are customary as crosslinking agents, such as methyl-etherified melamine resins such as the commercial products Cymel 325, Cymel 327, Cymel 350 and Cymel 370 or Maprenal MF 927, for example. Other examples of melamine resins which can be used include butanol- or isobutanol-etherified melamine resins such as the commercial products Setamin US 138 or Maprenal MF 610, for example; mixed etherified melamine resins which are both butanol- and methanol-etherified, such as Cymel 254, and also hexamethyloxymethyl-melamine (HMMM), such as Cymel 301 or Cymel 303, wherein the latter may require an external acid catalyst for crosslinking, such as p-toluenesulphonic acid for example. Acid catalysts of this type may optionally be blocked, ionically or non-ionically, with amines or polyepoxides.

Components E) based on triazine, which crosslink with the hydroxyl groups of components A), B) and optionally C) with the formation of ether and/or ester groups are transesterification crosslinking agents, particularly transesterification crosslinking agents which react with the hydroxyl groups with the formation of urethane groups (carbamic acid ester groups), such as preferably tris(alkoxycarbonylamino) triazine, for example, as described in EP-A-0 604 922.

Apart from the aforementioned solvents, the coating media which contain the binder vehicles to be used according to the invention may contain customary lacquer auxiliary materials in addition, for example spreading agents, e.g. those based on (meth)acrylic homopolymers, silicone oils, plasticisers such as esters of phosphoric acid, phthalic acid or citric acid, rheology influencers, such as pyrogenic silica or microgels, urea-containing reaction products of primary amines and polyisocyanates ("sagging control agents"), hydrogenated castor oil, hardening accelerators such as phosphoric acid, phosphoric acid esters, dicarboxylic acid semi-esters, or citric acid, for example; organic metal salts such as dibutyltin laurate, zinc naphthenate or bismuth tricarboxylate, and also compounds which contain tertiary amino groups such as triethylamine, and light stabilisers.

The coating media according to the invention may also exist in water-thinnable form. If an aqueous emulsion is to be produced, the solvent used for the production of the binder vehicle containing components A) and B) is substantially removed. This may be effected by distillation for example, optionally under vacuum. Provided that it contains acidic groupings, the binder vehicle concentrate which is obtained in this manner, which contains components A) and B) and which has a high solids content of 90% by weight for example, can then be neutralised with a customary base, e.g. ammonia or an organic amine, e.g triethylamine. The neutralised binder vehicle containing A) and B) which is obtained can be emulsified in water, optionally after the admixture of crosslinking agents D) and E). This can be effected, for example, with intensive stirring and with heating if necessary, for example to temperatures of 30 to 80° C., e.g. 50° C.

It is also possible for monomers comprising basic groupings, e.g. those which contain tertiary amine groups, to be polymerised in during the production of the (meth)acrylic copolymer A). Monomers of component E) are examples of monomers such as these. The binder vehicle containing basic groups which is produced in this manner can then be neutralised with acids, e.g. inorganic or organic acids such as formic acid or acetic acid. The neutralised binder vehicle containing A) and B) can be emulsified in water, optionally after the admixture of crosslinking agents D) and E). This can be effected, for example, with intensive stirring and with heating if necessary, for example to temperatures of 30 to 80° C., e.g. 50° C.

Alternatively, the binder vehicle containing A) and B) can be emulsified with the aid of a non-ionic emulsifier. This is effected, for example, by homogenisation of the binder vehicle concentrate, optionally together with crosslinking agents D) and E) and one or more non-ionic emulsifiers, and optionally with heating, for example to temperatures of 30 to 80° C., e.g. 60° C. A mixture of this type can be homogenised in a customary homogenisation device. Examples of the latter include rotor/stator homogenisers which operate at speeds of 8000 to 10,000 revolutions per minute, for example. The emulsifiers are used in amounts of 3 to 30% by weight, for example, with respect to the binder vehicle concentrate. Water-insoluble components of the coating medium, e.g. lacquer additives such as light stabilisers or spreading agents based on silicone oils, for example, may be admixed with the binder vehicle concentrate before conversion into the aqueous phase and emulsified together with it.

The coating media according to the invention are particularly suitable for the production of a transparent outer coat (clear lacquer coat) in the production of oven-drying multilayer coatings. The outer coat may be applied by the wet-into-wet process, for example, whereupon both coats are hardened jointly. Therefore, the invention also relates to a method of producing multilayer coatings and to the use of the coating media for the production thereof. In this respect, the non-aqueous coating media which are preferred according to the invention may be applied as transparent covering lacquers to coats comprising aqueous or solvent-containing base lacquers for hardenable multilayer coatings.

Pigmented coating media may also be produced. Customary organic and/or inorganic colouring pigments and/or extenders may be used for this purpose, such as titanium dioxide, micronised titanium dioxide, iron oxide pigments, carbon black, silica, barium sulphate, micronised mica, french chalk, azo pigments, phthalocyanine pigments, quinacridone or pyrrolopyrrol pigments.

The coating media according to the invention are applied by known methods, such as spraying, dipping, rolling or by doctor blade. In the course of this procedure, the covering lacquer coating is applied to the substrate, which is optionally already provided with further lacquer coats. The coating media according to the invention can also be applied by a spraying process using supercritical carbon dioxide as a solvent. The content of organic solvents can thereby be considerably reduced. After a vapour extraction phase, the applied coating medium is preferably crosslinked by heating. The stoving temperatures are preferably between 80 and 160° C., most preferably between 120 and 150° C. The hardening times are of the order of 20 to 40 minutes, for example. The coat thickness of the stoved film is about 15 to 50 $\mu$m, for example. A hard, crosslinked glossy lacquer coating is thus obtained. One preferred embodiment is the application of the coating medium according to the invention as a clear lacquer coating on to a base lacquer. This may preferably be effected wet-into-wet, or the base lacquer may be previously dried by heating. A particularly good adhesion between the two coats is obtained.

For example, base lacquers which may contain customary covering lacquer pigments can be overcoated with coating media according to the invention which are formulated as clear lacquers. The base lacquers preferably contain effect pigments, such as metallic pigments for example. Polyester, polyurethane or acrylate resins are preferably used as the binder vehicle basis of the base lacquer. These binder vehicles may optionally be crosslinked via crosslinking agents, e.g. melamine or isocyanate derivatives.

The coating media according to the invention are particularly suitable for covering lacquers or clear lacquers which are preferably used in the motor vehicle industry but are also used in other fields. The use of the coating medium according to the invention in multilayer coating is particularly suitable for the series coating of automobiles.

The coating media according to the invention are particularly suitable for producing a transparent outer coat of an oven-drying multilayer coating. They are particularly suitable for the series coating of automobiles and parts thereof.

The covering lacquer coats, e.g. clear lacquer coats, which are produced using the coating media according to the invention, and which contain (meth)acrylic copolymers A) synthesised in the presence of polyester resins B), are distinguished by their superior resistance to chemicals, particularly their resistance to acids, and by their excellent status as covering lacquers, as well as by their resistance to water of condensation (which is manifested in a particularly favourable humidity chamber resistance).

EXAMPLE 1

393.1 g isononanoic acid, 1.4 g phosphoric acid (85%), 287.4 g hexahydrophthalic anhydride, 274.9 g pentaerythritol and 43.2 g xylene were introduced into a reaction apparatus suitable for the synthesis of a polyester. The batch was heated to 210° C. over 5 hours with water being split off, with stirring and whilst passing inert gas over the batch. After an acid number of about 23 was reached, the batch was cooled to 140° C. and was diluted to a solids content of 70% by weight with SOLVESSO 100 (a commercial product manufactured by Shell AG).

EXAMPLE 2

170.3 g 1,6-hexanediol, 128.9 g trimethylolpropane, 0.9 g phosphoric acid (85%), 37 g xylene, 228.2 g hexahydrophthalic anhydride and 278.6 g dimeric fatty acid were introduced into a reaction apparatus suitable for the synthesis of a polyester. The batch was heated to 220° C. over 5 hours with water being split off, with stirring and whilst passing inert gas over the batch. After an acid number of about 25 was reached, the batch was cooled to 140° C. and was diluted to a solids content of 80% by weight with SOLVESSO 100 (a commercial product manufactured by Shell AG).

EXAMPLE 3

440 g of the polyester solution from Example 1, 28 g xylene, 73 g n-butyl acetate and 90.7 g SOLVESSO 100 (a commercial product manufactured by Shell AG) were placed in a 2 litre three-necked flask with ground glass joints, which was fitted with a stirrer, a contact thermometer and a dropping funnel, and were heated to 138° C. with stirring and with reflux cooling in operation. A mixture of 2.5 g acrylic acid, 49.5 g butyl acrylate, 93 g 2-hydroxyethyl methacrylate, 154 g styrene, 2.2 g di-tert.-butyl peroxide and 7 g tert.-butyl peroctoate were added continuously over 6 hours. The batch was then polymerised for 4 hours at 138° C., cooled to 100° C., and diluted with 60.1 g n-butyl acetate. The polymer solution had a solids content of 62.6%, an acid number of 16.5 mg KOH/g, an OH number of 135 mg KOH/g and a viscosity of 1440 mPa.s/25° C.

EXAMPLE 4

420 g of the polyester solution from Example 2, 30 g n-butanol and 140 g SOLVESSO 100 (a commercial product manufactured by Shell AG) were placed in a 2 litre three-necked flask with ground glass joints, which was fitted with a stirrer, a contact thermometer and a dropping funnel, and were heated to 147° C. with stirring and with reflux cooling in operation. A mixture of 3 g acrylic acid, 55 g butyl acrylate, 100 g 2-hydroxyethyl methacrylate, 167 g styrene and 9 g di-tert.-butyl peroxide was added continuously over 4 hours. The batch was then polymerised for 4 hours at 145° C., cooled to 100° C., and diluted with 76 g SOLVESSO 100. The polymer solution had a solids content of 67.0%, an acid number of 14.0 mg KOH/g, an OH number of 144 mg KOH/g and a viscosity of 2460 mPa.s/25° C.

EXAMPLE 5

A single-component clear lacquer was produced by homogeneously mixing 32.0 parts of the resin solution from Example 3 with 17.0 parts of the resin solution from Example 1, 15.5 parts of a 65% solution of a malonic acid diethyl ester-capped isocyanurate of isophorone diisocyanate in SOLVESSO 100, 16.3 parts of a 55% solution of a butanol-etherified melamine resin, 1.0 parts of a light stabiliser of the benzotriazole type, 0.5 parts of a light stabiliser of the HALS type, 0.7 parts of a 10% silicone oil solution, 5 parts of n-butanol and 12 parts of SOLVESSO 100 (a commercial product manufactured by Shell AG).

EXAMPLE 6

A single-component clear lacquer was produced by homogeneously mixing 29.6 parts of the resin solution from Example 4 with 17.0 parts of the resin solution from Example 1, 15.5 parts of a 65% solution of a malonic acid diethyl ester-capped isocyanurate of isophorone diisocyanate in SOLVESSO 100, 16.3 parts of a 55% solution of a butanol-etherified melamine resin, 1.0 parts of a light stabiliser of the benzotriazole type, 0.5 parts of a light stabiliser of the HALS type, 0.7 parts of a 10% silicone oil solution, 5 parts of n-butanol and 14.4 parts of SOLVESSO 100 (a commercial product manufactured by Shell AG).

Bodywork panels which had been previously coated with commercially available cathodically depositable electro-dip lacquer (KTL) (18 μm) and commercially available primer surfacer, as used in the series coating of automobiles, were coated with commercially available, water-thinnable metallic base lacquer to a dry coat thickness of 15 μm and pre-dried for 6 minutes at 80° C. Immediately thereafter, the clear lacquer from Example 5, 6 or from a comparative example (Example 2 from EP-A-0 653 458) was applied wet-into-wet, by spray application, to give a dry coat thickness of 35 μm, and after vapour removal for 5 minutes at room temperature was stoved for 20 minutes at 140° C.

The results obtained are given in Table 1. The tests were performed according to the general industry standards. The drop test with 10% sulphuric acid was selected for testing the resistance of the clear lacquers to sulphuric acid. The test coupons were placed on a heatable plate and heated to 60° C.

In the course of this procedure, it had to be ensured that the metal sheets were lying flat, for the optimum transfer of temperature. At the end of the heat-up phase, i.e. at 60° C., one drop per minute was applied to the surface of the clear lacquer. The total time was 30 minutes. After the test period had elapsed the coating was washed with water. If necessary, a brush could additionally be used for cleaning.

In order to assess the resistance to sulphuric acid, the period of influence is quoted in minutes at which the first visible change in the film (swelling), damage (matting) and attack of the base lacquer occurred.

| | Examples according to the invention | | Comparison 2 from EPA-0 653 468 |
|---|---|---|---|
| Example | 5 | 6 | 653 468 |
| 20° gloss: (DIN 67530) | 92 | 93 | 88 |
| Pendulum hardness: (oscillations) | 128 | 109 | 77 |
| Sulphuric acid test: 10% H$_2$SO$_4$, 30'60° C. | | | |
| Swelling | 19 | 18 | 17 |
| Matting | >30 | 27 | 22 |
| Basecoat attack | >30 | >30 | 30 |
| Condensation chamber (DIN 50017) after 240 hours: | intact surface | intact surface | matting |

We claim:

1. A method of producing multilayer coatings comprising:
   applying to a substrate a base lacquer coat comprising an aqueous coating medium containing a pigment wherein said substrate is optionally pre-coated,
   overcoating said base lacquer coat with a transparent covering lacquer coat;
   wherein the transparent covering lacquer coat is produced from a non-aqueous coating medium, containing as a binder vehicle:

| | |
|---|---|
| A) 10 to 90% by weight | of one or more hydroxy-functional (meth)acrylic copolymers, obtained from |
| a1) 20 to 40% by weight | of one or more hydroxyalkyl esters of (meth)acrylic acid |
| a2) 10 to 30% by weight | of one or more non-functionalised (meth)acrylates |
| a3) 0 to 5% by weight | of one or more unsaturated carboyxlic acids |
| a4) 10 to 60% by weight | of one or more non-functionalised monomers different from a2) |
| a5) 0 to 15% by weight | of one or more amino-functional monomers |
| a6) 0 to 5% by weight | of one or more multiply-unsaturated monomers |
| B) 90 to 10% by weight | of one or more hydroxy-functional polyesters, |
| C) 0 to 40% by weight | of one or more hydroxy-functional binder vehicles different from A) and B), |
| D) 5 to 50% by weight | of one or more blocked polyisocyanates, |
| E) 5 to 40% by weight | of one or more components based on triazine which crosslink with the hydroxyl groups of components A), B) and optionally C) with the formation of ether and/or ester groups, | wherein the sum of components A) to E) adds up to 100% in each case, and wherein at least 50% by weight of the (meth)acrylic copolymers, with respect to the total amount of component A), has been produced in the presence of one or more of the hydroxy-functional polyesters corresponding to at least 20% by weight of the total amount of component B).

2. A method according to claim 1, wherein the non-aqueous coating medium for producing the transparent covering lacquer coat contains as a binder vehicle:

| | |
|---|---|
| A) 10 to 90% by weight | of one or more hydroxy-functional (meth)acrylic copolymers, obtainable from |
| a1) 20 to 40% by weight | of one or more hydroxyalkyl esters of (meth)acrylic acid |
| a2) 10 to 30% by weight | of one or more non-functionalised (meth)acrylates |
| a3) 0 to 5% by weight | of one or more unsaturated carboxylic acids |
| a4) 10 to 60% by weight | of one or more non-functionalised monomers different from a2) |
| a5) 0 to 15% by weight | of one or more amino-functional monomers |
| a6) 0 to 5% by weight | of one or more multiply-unsaturated monomers |
| B) 90 to 10% by weight | of one or more hydroxy-functional polyesters, obtainable from |
| b1) 0 to 60% by weight | of monocarboxylic acids of molecular weight range 112 to 600 |
| b2) 10 to 70% by weight | of polycarboxylic acids of molecular weight range 98 to 600 or anhydrides of polycarboxylic acids of this type |
| b3) 5 to 40% by weight | of tri- and/or polyhydric alcohols of molecular weight range 100 to 400 |
| b4) 0 to 40% by weight | of dihydric alcohols of molecular weight range 62 to 2000 |
| b5) 0 to 30% by weight | of monohydric alcohols of molecular weight range 100 to 400 |
| b6) 0 to 15% by weight | of hydroxycarboxylic acids of molecular weight range 90 to 280 or of lactones of hydroxycarboxylic acids of this type |
| b7) 0 to 15% by weight | of aminoalcohols of molecular weight range 61 to 300 and/or of aminocarboxylic acids of molecular weight range 75 to 260 |
| C) 0 to 40% by weight | of one or more hydroxy-functional binder vehicles different from A) and B), |

-continued

| | |
|---|---|
| D) 5 to 50% by weight | of one or more blocked polyisocyanates, |
| E) 5 to 40% by weight | of one or more components based on triazine which crosslink with the hydroxyl groups of components A), B) and optionally C) with the formation of ether and/or ester groups, | wherein the sum of components A) to E), a1) to a6) and b1) to b7) adds up to 100% in each case,
and wherein at least 50% by weight of the (meth)acrylic copolymers, with respect to the total amount of component A), has been produced in the presence of one or more of the hydroxy-functional polyesters corresponding to at least 20% by weight of the total amount of component B).

3. A method according to claim 1, wherein the (meth) acrylic copolymers A) have a number average molecular weight (Mn) of 1000 to 10000, an OH number from 30 to 250 mg KOH/g and an acid number from 0 to 60 mg KOH/g and the polyester resins B) have a number average molecular weight (Mn) of 200 to 5000, an OH number of 30 to 450 mg KOH/g and an acid number from 0 to 60 KOH/g.

4. A method according to claim 2, wherein the (meth) acrylic copolymers A) have a number average molecular weight (Mn) of 1000 to 10000, an OH number from 30 to 250 mg KOH/g and an acid number from 0 to 60 mg KOH/g and the polyester resins B) have a number average molecular weight (Mn) of 200 to 5000, an OH number of 30 to 450 mg KOH/g and an acid number from 0 to 60 KOH/g.

5. A method according to claim 1, comprising:

applying the transparent covering lacquer coat wet-on-wet to the aqueous base lacquer coat; and stoving both layers jointly.

6. A method according to claim 2, comprising:

applying the transparent covering lacquer coat wet-on-wet to the aqueous base lacquer coat; and stoving both layers jointly.

7. A method according to claim 1, comprising:

applying the multi-layer coating during on-line lacquering of motor vehicles.

8. A method according to claim 3, comprising:

applying the multi-layer coating during on-line lacquering of motor vehicles.

* * * * *